United States Patent [19]
Edwards et al.

[11] Patent Number: 4,775,655
[45] Date of Patent: Oct. 4, 1988

[54] POROUS CARBON STRUCTURES AND METHODS FOR THEIR PREPARATION

[75] Inventors: Christopher J. C. Edwards, Buxtehude, Fed. Rep. of Germany; David A. Hitchen, Cheshire; Martin Sharples, Wirral, both of England

[73] Assignee: Internationale Octrooi Maatschappij "Octropa", Rotterdam, Netherlands

[21] Appl. No.: 930,926

[22] Filed: Nov. 17, 1986

[30] Foreign Application Priority Data

Nov. 18, 1985 [GB] United Kingdom ................ 8528352
Sep. 16, 1986 [GB] United Kingdom ................ 8622292

[51] Int. Cl.⁴ .................. C01B 31/00; C01B 31/02; B01J 21/18; B01J 20/20
[52] U.S. Cl. .................. 502/416; 264/29.1; 264/29.6; 423/445; 423/449; 502/418; 502/437; 502/180
[58] Field of Search .............. 502/416, 418, 420, 436, 502/437, 180; 423/445, 449; 264/29.1, 29.6, 29.7

[56] References Cited

U.S. PATENT DOCUMENTS

| | | | |
|---|---|---|---|
| 3,302,999 | 2/1967 | Mitchell | 264/29.7 |
| 3,446,593 | 5/1927 | Moutand | 264/29.6 |
| 3,574,548 | 4/1971 | Sands et al. | 264/29.1 |
| 3,928,544 | 12/1975 | Yakota et al. | 423/449 |
| 4,022,875 | 5/1977 | Vinton et al. | 423/445 |
| 4,522,953 | 6/1985 | Barby et al. | 521/63 |
| 4,536,521 | 8/1985 | Haq | 521/63 |
| 4,611,014 | 9/1964 | Jones et al. | 521/146 |
| 4,612,334 | 9/1986 | Jones et al. | 521/146 |

FOREIGN PATENT DOCUMENTS

| | | | |
|---|---|---|---|
| 59-21511 | 2/1984 | Japan | 502/180 |
| 1031126 | 5/1966 | United Kingdom | 423/445 |

Primary Examiner—Paul E. Konopka
Attorney, Agent, or Firm—Cushman, Darby & Cushman

[57] ABSTRACT

This invention relates to the production of a novel, porous, carbon structure. A stabilised porous polymer comprising cavities joined by interconnecting pores is heated in an inert atmosphere to yield a stable, porous, carbon structure having the inherent structure of the original stabilised polymer.

9 Claims, 2 Drawing Sheets

50μ

POROUS CARBON STRUCTURES AND METHODS FOR THEIR PREPARATION

This invention relates to porous carbon structures and to a process for their preparation.

In U.S. Pat. No 4,522,953, novel, cross-linked, homogeneous, porous polymeric materials were disclosed which can be made by polymerisation of a high internal phase emulsion comprising as a continuous phase a monomer and cross-linking agent, and as a discontinuous phase water, or aqueous solution.

Subsequently, it was found that these porous polymers and other porous polymers will, on sulphonation, generate a sulphonated polymer having outstanding absorption of ionic solutions. Details of this invention are set out in U.S. Pat. No. 4,536,521.

Other functionalised highly porous cross-linked polymers prepared by a similar process have been disclosed in U.S. Pat. Nos. 4,611,014 and 4,612,334.

The porous polymers disclosed in these United States specifications comprise 80% or a higher percentage of voids in the form of cavities interlinked by pores in the cavity walls and generally the porous structure consists of concave surfaces.

It has now been found that certain porous polymers of this general type, when suitably stabilised to ensure that they do not de-polymerise on heating, can yield a porous carbon structure, which retains the cavities and interconnecting pores inherent in the original porous polymeric structure, and consists essentially of concave surfaces.

The modification required to stabilise the polymeric material against de-polymerisation during heating can be in various forms, such as a high degree of cross-linking and the inclusion in the polymer of groups or elements which effectively reduce or prevent depolymerisation under the heating conditions employed, or the addition of a reinforcing resin.

Accordingly the present invention provides a porous carboniferous structure consisting of concave surfaces and having at least 80% voids and comprising cavities joined by interconnecting pores and having a density of less than 0.5 g/cm$^3$.

Preferably the porous carboniferous structure has at least 90% voids and a density of less than 0.25 g/cm$^3$.

Preferably, if maximum thermal stability is required, the degree of cross-linking is greater than 20% and the other modification is of at least 50%.

The other modification can be provided by the inclusion of stabilising elements or groups.

Suitable elements include the halogens and the preferred halogen is chlorine.

Suitable groups to achieve this enhanced stability include nitro groups as well as sulphonates. Other groups include —CN, —CH$_2$Cl and —OCH$_3$, which like the sulphonate groups can be introduced into the polymer after its formation or by selection of appropriately modified monomers.

As explained in U.S. Pat. No. 4,536,521, the sulphonation of the porous polymeric material may be carried out by a number of different routes, but to obtain a stable carbon structure, it is desirable that at least 5% of the polymer is cross-linked and furthermore that at least 10% of the cross-linked polymer is sulphonated. Preferably 20% is cross-linked and 50% of the cross-linked polymer sulphonated.

The stability of the porous polymer at high temperature appears to be related both to the degree of cross-linking and to the degree of sulphonation.

The preferred polymers are of styrene crosslinked with for example divinyl benzene, but other suitable comonomers may be blended with this monomer providing an adequate amount of cross-linking is achieved to form a rigid polymeric structure able to withstand the heating required in the preparation of the carbon structure.

This invention also provides a process for the manufacture of a porous carbon structure comprising heating a stabilised, cross-linked, porous polymer in an inert atmosphere to a temperature of at least 500° C. Preferably, the temperature is raised to at least 1200° C. if the stabilising agent content of the final carboniferous structure is to be reduced.

Alternatively, polymers which may be stabilised against depolymerisation may be provided using monomers other than styrene. The only other essential feature of such monomers is that they are sufficiently water-immiscible to form a stable high internal phase emulsion which can be polymerised to form the basic porous structure required in these materials. Suitable monomers include alkyl acrylonitriles such as methacrylonitrile cross-linked with divinyl benzene and crotononitrile cross-linked with divinyl benzene.

The rate at which the temperature of the porous polymer is raised and the gaseous environment in which the heating takes place must be carefully controlled to prevent damage to the porous structure by the sudden evolution of degradation products. However, these factors are related to the actual polymer chosen and precise conditions can readily be found by experiment. Clear guidance is given in the following examples concerning various polymer systems.

This invention also provides a process in which the porous polymer is a flexible polymer and is modified by the incorporation of a resin to coat the interior surfaces of the polymer, prior to heating to carbonise the polymer.

Figure 1:
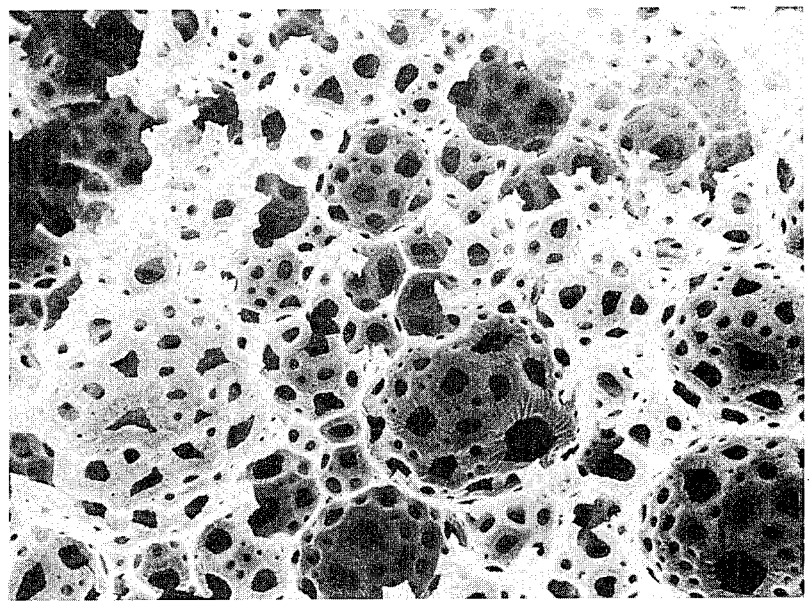
FIGS. 1 and 2 are electron micrographs of products according to the invention.

The following examples illustrate the preparation of the porous carbon structures provided by this invention.

EXAMPLE 1

A high internal phase emulsion was prepared by the method disclosed in U.S. Pat. No. 4,522,953. The continuous phase was made up from the monomer and cross-linking agent which was divinyl benzene containing approximately 50% of ethyl vinyl benzene and present in an amount sufficient to give 20% to 40% cross-linked density. The aqueous phase comprised potassium persulphate initiator at 2.5 g per litre and 0.1M calcium chloride. The aqueous phase was sufficient to generate a 90% void volume in the high internal phase emulsion. The high internal phase emulsion was polymerised and dried in accordance with the teaching of U.S. Pat. No. 4,522,953.

Samples of the dried polymer were heated in an electrically heated tube furnace from ambient temperature to 600° C. in an oxygen-free nitrogen atmosphere. The rate of heating was generally controlled below 5° C. per minute and in the range 180° C. to 380° C. the rate of heating was below 2° C. per minute. After the heating process the samples were cooled to ambient temperature in an inert atmosphere to prevent oxidation by air. The chemical and physical properties of the carbonised polymers are set out in Tables 1 and 2 below. In the column headed "Materials", "a" represents the monomer volume in $cm^3$, "b" the cross-linking agent volume in $cm^3$ and "c" the surfactant weight in grams. The surfactant in each case was Span 80 (sorbitan monooleate).

TABLE 1

| Material | Poly(3-chlorostyrene) | Carbonised |
|---|---|---|
| a, b, c | 5:5:2 | 600° C./nitrogen |
| Surface area | $40 \pm 10$ $m^2/g^{-1}$ | $520 \pm 10$ $m^2/g^{-1}$ |
| Permeability | 2.8 Darcys | 5.4 Darcys |
| Bubble point | 0.055 $kg/cm^{-2}$ | 0.04 $kg/cm^{-2}$ |
| Electrical resistivity | $>10^8$ ohm meter | $>10^8$ ohm meter |

TABLE 2

| Material a, b, c | Poly (2-Cl styrene) 7:4:2 | Poly (3-Cl styrene) 5:5:2 | Poly (4-Cl styrene) 5:5:2 |
|---|---|---|---|
| Native weight | 2.7080 g | 1.5801 g | 1.5082 g |
| Carbonised to 600° C./$N_2$ | 0.5024 g | 0.6884 g | 0.2952 g |
| Native compn | C = 73.21% H = 6.51% Cl = 13.73% | C = 76.70% H = 6.16% Cl = 13.98% | C = 76.66% H = 6.57% Cl = 13.96% |
| Carbonised compn | C = 73.39% H = 2.36% Cl < 1% | C = 82.06% H = 2.81% Cl < 1% | C = 86.50% H = 3.60% Cl < 1% |

EXAMPLE 2

Using the same processing techniques a flexible porous polymer was prepared comprising ethyl hexyl acrylate:styrene (60:40) at 90% void volume using a 0.1M calcium chloride solution and cross-linked with 10% commercial divinyl benzene. A dried strip of the polymer weighing 0.75 g was soaked in furan resin until the strip was wet throughout in approximately 2 minutes. The excess resin was removed from the strip and the resulting moist sample cured at 60° C. for 2 days in air. The cured sample weighed 1.80 g. This sample was carbonised carefully to a temperature of 1000° C. and the resulting product was an electrically-conducting porous carbon of extreme fragility weighing 0.59 g. This sample, having dimensions 10 mm × 8 cm, had a resistance of approximately 50 ohms.

EXAMPLE 3

A further porous polymer was prepared using 5 $cm^3$ methylacrylonitrile and 5 $cm^3$ divinyl benzene containing 55% ethyl vinyl benzene to a 90% void volume using 0.1M calcium chloride solution and persulphate initiator. A sample of the dried polymer was heated in an inert atmosphere of argon to 1000° C. at 3° C. per minute, except in the region 300° C. to 500° C. in which the rate was 1° C. per minute. The resulting material was porous and approximately 4 times stronger than the original porous polymer. It was also electrically-conducting. A sample 10 mm × 7 mm × 3 cm had resistance of approximately 4 ohms, giving a resistivity of approximately 6 to $7 \times 10^{-3}$ ohms meters. The carbonised polymer had approximately 40% of the weight of the original porous polymer.

Table 3 includes physical data relevant to characterise the examples.

TABLE 3

|  | $\rho$app | mpd | ipv |
|---|---|---|---|
| 5:5:2 poly(3-chlorostyrene) | 0.065 $g/cm^{-3}$ | 6.29 μm | 4.34 $cm^3/g^{-1}$ |
| 5:5:2 carbonised to 600° C. | 0.099 $g/cm^{-3}$ | 6.10 μm | 4.49 $cm^3/g^{-1}$ |
| 5:5:2 poly(methacrylonitrile) | 0.068 $g/cm^{-3}$ | 2.78 μm | 3.46 $cm^3/g^{-1}$ |
| 5:5:2 carbonised to 1000° C. | 0.104 $g/cm^{-3}$ | 2.16 μm | 3.42 $cm^3/g^{-1}$ |

|  | Compression modulus | Yield Stress |
|---|---|---|
| 5:5:2 poly(methacrylonitrile) 90% void volume | 0.48 $N/m^{-2} \times 10^{-7}$ | 0.6 $N/m^{-2} \times 10^{-6}$ |
| 5:5:2 poly(methacrylonitrile) 90% void volume carbonised to 1000° C. | 1.85 $N/m^{-2} \times 10^{-7}$ | 2.3 $N/m^{-2} \times 10^{-6}$ |

$\rho$app = apparent density
mpd = median pore diameter*
ipv = intrusion pore volume*
*determined up to 40,000 $N/cm^{-2}$, using mercury porisimetry.

EXAMPLE 4

0.233 g of a sulphonated polystyrene, porous polymer, prepared according to Example 17 of U.S. Pat. No 4,536,521, having a degree of cross-linking of 20% and a degree of sulphonation of 70% and a porosity of 98% voids was heated in an electric furnace under a nitrogen atmosphere for 30 minutes. The sample was cooled under a nitrogen atmosphere and reweighed and found to weigh 0.118 g. Elemental analysis showed that negligible amounts of hydrogen were in the product. EDAX (energy dispersive X-ray analysis) indicated that about 40% of the initial sulphur remained in the product. On further heating under an inert atmosphere, this sulphur content can be reduced to effectively zero at about 1200° C. to yield a porous carbon having a density of 0.04 $g/cm^3$.

FIG. 1 is an electron micrograph of the product after heating to 500° C. and it will be apparent from the micrograph that the cavities and interconnecting pores and concave structure are present in the carboniferous structure.

EXAMPLE 5

Figure 2:
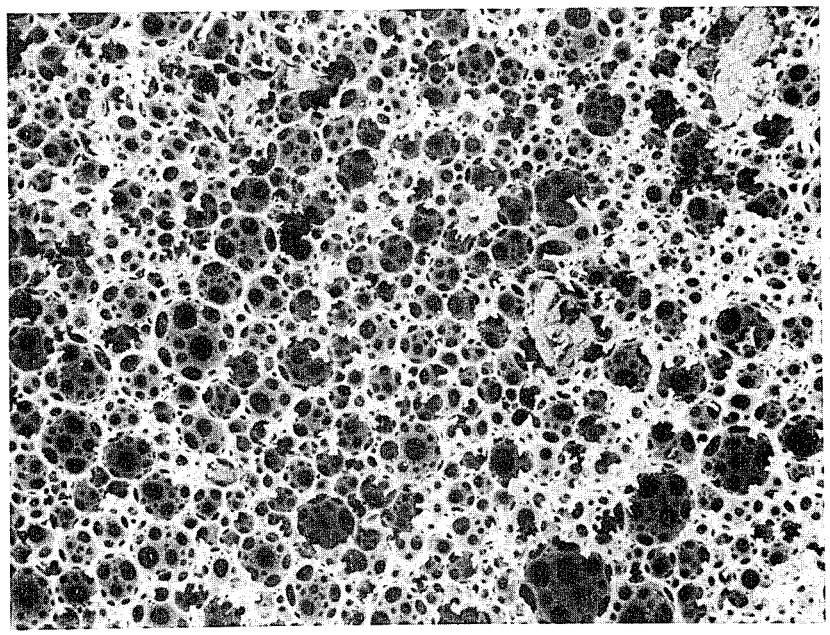

A sample of poly(4-chlorostyrene) 5:5:2 as described in Table 2 was heated to 1000° C. using the technique set out in Example 3 to produce a further sample of the porous carbon provided by the present invention. FIG. 2 is an electron micrograph of this material.

We claim:
1. A porous carboniferous structure consisting of concave surfaces and having at least 80% voids and comprising cavities joined by interconnecting pores and having a density of less than 0.5 $g/cm^3$, the carboniferous structure being derived from a porous cross-linked polymer formed by polymerising monomer and cross-linking agent as a contonus phase of a high internal phase emulsion having an aqueous discontinuous phase.

2. A porous carboniferous structure as claimed in claim 1 having at least 90% voids and a density of less than 0.25 g/cm$^3$.

3. A process for the manufacture of a porous carbon structure comprising heating a stabilised, cross-linked, porous polymer in an inert atmosphere to a temperature of at least 500° C., the cross-linked porous polymer being formed by polymerising monomer and cross-linking agent as a continuous phase of a high internal phase emulsion having an aqueous discontinous phase.

4. A process as claimed in claim 3 in which the porous polymer is a sulphonated polystyrene.

5. A process as claimed in claim 4 in which at least 20% of the polymer is cross-linked and 50% of the cross-linked polymer is sulphonated.

6. A process as claimed in claim 3 in which the cross-linked polymer is an alkyl acrylonitrile.

7. A process as claimed in claim 3 in which the cross-linked polymer is a polychlorostyrene.

8. A process as claimed in claim 7 in which the degree of cross-linking is greater than 20%.

9. A process as claimed in claim 3 in which the porous polymer is a flexible polymer and is modified by the incorporation of a resin to coat the interior surfaces of the polymer, prior to heating to carbonise the polymer.

* * * * *